Figure 1:
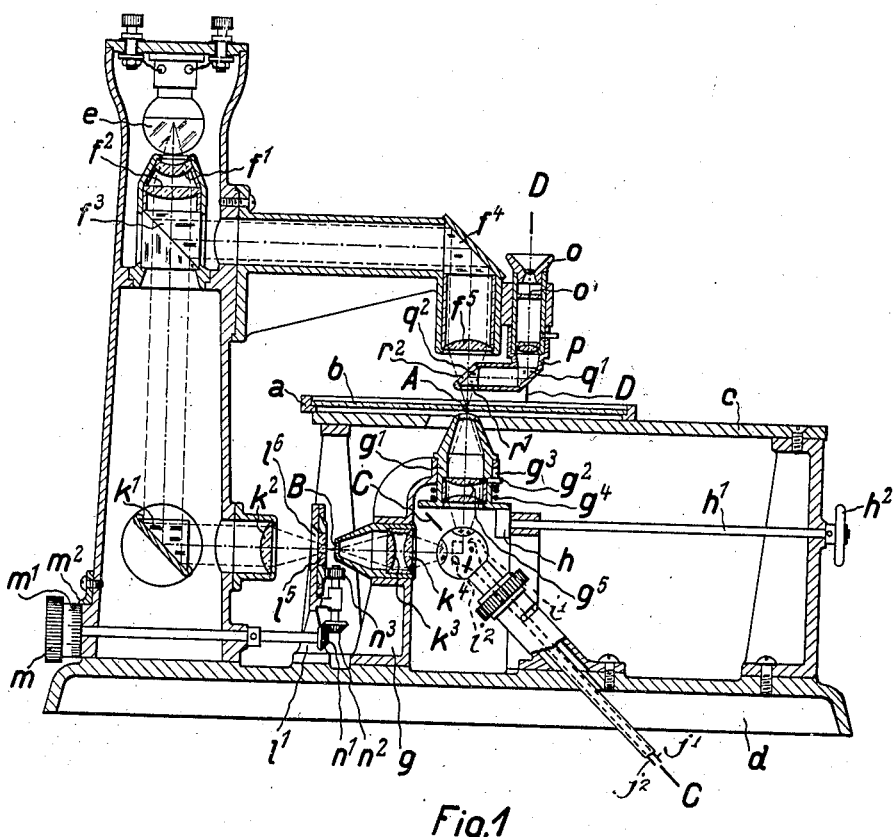

Sept. 1, 1931.  R. MECHAU  1,821,391
DEVICE FOR ASCERTAINING THE OPACITY OF BLACKENED
PORTIONS OF PHOTOGRAPHIC PLATES
Filed March 16, 1929

Inventor:
Robert Mechau

Patented Sept. 1, 1931

1,821,391

UNITED STATES PATENT OFFICE

ROBERT MECHAU, OF JENA, GERMANY, ASSIGNOR TO THE FIRM CARL ZEISS, OF JENA, GERMANY

DEVICE FOR ASCERTAINING THE OPACITY OF BLACKENED PORTIONS OF PHOTOGRAPHIC PLATES

Application filed March 16, 1929, Serial No. 347,699, and in Germany March 15, 1928.

The present invention refers to devices for ascertaining the part of a pencil of rays which is passing through an exposed photographic plate at different places. Such devices are for instance applied for evaluation of photographs of stars in order to ascertain which order the different photographed stars belong to. The photographic plate thereby is fixed in a frame which is slidable in a plane, and a cone of rays is projected perpendicularly on the plate. Then, when adjusting the photographic plate in such a manner that the image of the star to be measured is in the pencil of rays and when measuring the part of the pencil of rays which is allowed to pass the said part of the plate for instance by means of a thermo-element arranged behind the plate, which is connected with a current indicating device, the order of the star aimed at can be found by comparing the part found in this way with the part of rays which goes through another part of the plate and on which there is the image of a star of known size. However, the results obtained up to the present contained comparatively great mistakes which could not be avoided by the apparatus in use hitherto.

According to the invention, the devices in question are constructed in such a way that during the measuring period the photographic plate is supported always quite by a rest near the spot to be examined, and, thereby, far better results than hitherto are obtained. This is explained by the fact that with this arrangement the photographic plate will cut the pencil of rays always in one and the same section which up to the present, with the plate supported at its edges, was not always the case, for, as was proven, the plates are oftentimes curved and, as a consequence, the images of stars frequently were in such sections of the pencil of rays, which are of a different degree of brightness.

When the photographic plates in question are long and narrow, as for instance the plates for spectrophotograms, the rest corresponding to the invention is conveniently provided in such a manner that the plates are held by two rolls which have their axes in a straight line intersecting the said pencil of rays at a right angle, whereby the said rolls are given such distance from each other that the pencil of rays can pass between. However, when the photographic plates to be evaluated are comparatively broad, as is the case with plates for photographing stars, the rest corresponding to the invention can be provided in such a way that during the measuring period the plate is held by an annular body of comparatively small diameter which concentrically surrounds the pencil of rays acting on the plate. In this case the said annular body can be used also as diaphragm providing the delimitation of the said part of the photographic plate, whereby the layer sensitive to light of the plate is made to face the diaphragm. In order to avoid a being in the way of the ring when the plate is moved, it is made slidable perpendicularly to the photographic plate and during the shifting of the plate the contact the said plate has with the ring is to be interrupted.

Figure 2:
Figure 3:
Figure 4:
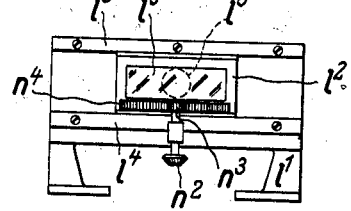

The accompanying drawings show a constructional example of a pyrometric device corresponding to the invention of the last named kind for evaluating photographs of stars. Fig. 1 of the drawings represents a section through the whole photometer, Figs. 2 to 4 single parts of the same and Fig. 5 a connection scheme.

Figure 5:
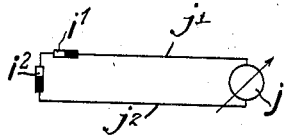

In the device represented by the drawing a photographic plate $b$ is supported by a frame $a$ in such a way that the sensible side of the said plate is the downward one and that the said plate can be slided to all sides on a table $c$ which is carried by a foundation plate $d$. An incandescent lamp $e$ throws a pencil of rays on the photographic plate $b$ by means of two lenses $f^1$, $f^2$, two prisms $f^3$ and $f^4$ and a collecting lens $f^5$ of which the back focal plane is going through the point marked A. Below the table $c$ in a support $g$ fixed to the foundation plate $d$ a tubular rest $g^1$ is arranged concentrically to the axis of the pencil of rays striking on plate $b$, which tubular rest is slidable in the direction of the axis of the pencil of rays. On the rest $g^1$ there is fixed a pin $g^2$ which catches into a slit $g^3$ of the support $g$. Below the cylindrical part $g^1$ an eccentric $h$ is provided which can be turned by means of a rod $h^1$ and a hand wheel $h^2$. By a coil $g^4$ the rest $g^1$ is continuously pressed against the eccentric $h$. With exception of a small opening, the rest $g^1$ is closed on its upper end. At its lower end the rest $g^1$ is provided with a condenser of two lenses which directs the pencil of rays working on the photographic plate $b$ to a thermoelement $i^1$ (Figs. 1 and 5) contained in a spherically shaped casing $i$. In this casing $i$ still a second thermoelement $i^2$ is arranged (Figs. 1 and 5). As Figs. 1 and 5 show, the thermoelements are connected with each other and, by means of wires $j^1$ and $j^2$ with a galvanometer $j$, so that, when the elements $i^1$ and $i^2$ are equally heated, no current will pass through the galvanometer $j$ and, consequently, its hand will point at zero. A pencil of rays also coming from the lamp $e$ is directed to the thermoelement $i^2$. For this reason the reflecting surface of the prism $f^3$ is silverplated in such a way that it is semi-transparent, so that half of the rays striking on this surface will go through the surface and only the other half is reflected and passed on to the thermoelement $i^1$. The light gone through the reflecting surface strikes on a prism $k^1$, on a collecting lens $k^2$ and, after having passed a diaphragm B, on a condenser of two lenses $k^3$, $k^4$ which projects it on the thermoelement $i^2$. Between the diaphragm B and the lens $k^2$ on the foundation $d$ there is fixed a small support $l^2$ on which a slide $l$ can be moved between the guides $l^3$ and $l^4$. The slide $l^2$ is provided with a wedge-shaped smoked glass $l^5$ which is fixed behind an opening $l^6$ of the small support $l^1$, so that the intensity of the heat radiation passed through can be varied by altering the position of the slide $l^2$. For altering the position of the slide $l^2$ there serves a knob $m$ the movement of which is conveyed by two conical rolls $n^1$ and $n^2$ to a spurwheel $n^3$ catching into a rack $n^4$ attached to the slide $l^2$. The knob $m$ is provided with a scale $m^1$ with a hand $m^2$ arranged opposite. The body $i$ containing the thermoelements $i^1$ and $i^2$ can be turned on an axis C—C which intersects the illuminating pencils at an angle of 45°, so that, by turning the body $i$ by 180° the two thermoelements can be interchanged. Finally the apparatus is provided with a finding device for exact adjustment in the desired position of the photographic plate to be evaluated. This device consists of a magnifying glass $o$ having a reticule $o^1$, and round the optical axis D—D of the said magnifying glass there is rotatably arranged an arm $p$ which contains two rectangular isosceles prisms $q^1$ and $q^2$. In order to allow the plate $b$ to be illuminated through the prism $g^2$ during the adjusting period, the frame of the prism $g^2$, in addition to the observation aperture $r^1$ for the magnifying glass, has still an opening $r^2$ on the hypotenuse side of the prism.

The device represented by the drawings is conveniently applied as follows:

When the arm $p$ and the eccentric $h$ are in the position as shown in the drawings, first the photographic plate $b$ is to be adjusted in such a manner that the intersection point of the reticule $o^1$ covers a star of known size. Thereupon the arm $p$ is turned aside and by means of the handwheel $h^2$ the eccentric $h$ is turned so far until the rest $g^1$ touches the plate $b$, in consequence whereof the image of the star intersects the pencil of rays, which is striking on the plate $b$, always exactly in the focal plane of the lens $f^5$, whether the said plate is curved or not. Then, by means of the knob $m$ the wedge-shaped smoked glass $l^5$ is adjusted in such a way that the hand of the galvanometer shows at zero. Finally the body $i$ together with the thermoelements $i^1$ and $i^2$ are turned by 180° and, if so required, the hand of the galvanometer is brought to zero again by moving the wedge-shaped smoked glass $l^5$. At both adjustments of the smoked glass the position of the hand $m^2$ is to be read off on the scale $m^1$. In order to be in a position to aim at another star which is to be compared with the one already determined, first the arm $p$ and, by turning the eccentric $h$, also the rest $g^1$, again are to be brought into the position shown in the drawing and thereupon the proceeding is the same as before. From the values read off on the scale $m^1$ the values required can be determined.

I claim:

1. In a device for ascertaining the opacity of blackened portions of photographic plates a support, a frame adapted for holding a photographic plate and being movably mounted on the support, a source of light, a lens system adapted to convey to the said plate rays coming from the source of light, means for indicating the quantity of rays that the plate allows to pass, and a rest mounted on the said support, this rest being movable perpendicularly to the plate and bordering the plate at the spot to be examined.

2. In a device for ascertaining the opacity of blackened portions of photographic plates a support, a frame adapted for holding a photographic plate and being movably mounted on the support, a source of light, a lens system adapted to convey to the said plate rays coming from the source of light, means for indicating the quantity of rays that the plate allows to pass, and a tubular part fitted on the support, the axis of the tubular part being perpendicular to the plate, the said tubular part being displaceable in the direction of its axis.

3. In a device for ascertaining the opacity of blackened portions of photographic plates a support, a frame adapted for holding a photographic plate and being movably mounted on the support, a source of light, a lens system adapted to convey to the said plate rays coming from the source of light, an element sensitive to the rays, lying in the path of the rays which the plate allows to pass, an electric indicating instrument, electric lines combining the said instrument with the said element, and a rest mounted on the said support, this rest being movable perpendicularly to the plate and bordering the plate at the spot to be examined.

4. In a device for ascertaining the opacity of blackened portions of photographic plates a support, a frame adapted for holding a photographic plate, and being movably mounted on the support, a source of light, a lens system adapted to convey to the said plate rays coming from the source of light, an element sensitive to the rays, lying in the path of the rays which the plate allows to pass, an electric indicating instrument, electric lines combining the said instrument with the said element, a tubular part fitted on the support, the axis of the tubular part being perpendicular to the plate, the said tubular part being displaceable in the direction of its axis, and a collecting lens system fixed in the said tubular part and having its focus approximately in the upper end surface of the tubular part.

5. In a device for ascertaining the opacity of blackened portions of photographic plates a support, a frame adapted for holding a photographic plate and being movably mounted on the support, a source of light, a lens system adapted to convey to the said plate rays coming from the source of light, a thermoelement lying in the path of the rays which the plate allows to pass, an electric indicating instrument, electric lines combining the said instrument with the said thermoelement, and a rest mounted on the said support, this rest being movable perpendicularly to the plate and bordering the plate at the spot to be examined.

6. In a device for ascertaining the opacity of blackened portions of photographic plates a support, a frame adapted for holding a photographic plate and being movably mounted on the support, a source of light, a lens system adapted to convey to the said plate rays coming from the source of light, the plate and the source of light, a thermoelement lying in the path of the rays which the plate allows to pass, a second thermoelement, a second lens system adapted to convey to the said second thermoelement rays coming from the source of light, an electric indicating instrument, electric lines connecting the said instrument with the said thermoelements, and a rest mounted on the said support, this rest being movable perpendicularly to the plate and bordering the plate at the spot to be examined.

7. In a device for ascertaining the opacity of blackened portions of photographic plates a support, a frame adapted for holding a photographic plate and being movably mounted on the support, a source of light, a lens system adapted to convey to the said plate rays coming from the source of light, the plate and the source of light, a thermoelement lying in the path of the rays which the plate allows to pass, a second thermoelement, a second lens system adapted to convey to the said second thermoelement rays coming from the source of light, a body carrying the said two thermoelements, the body being rotatably supported in order to allow the two thermoelements to be interchanged, and a rest mounted on the said support, this rest being movable perpendicularly to the plate and bordering the plate at the spot to be examined.

8. In a device for ascertaining the opacity of blackened portions of photographic plates a support, a frame adapted for holding a photographic plate and being movably mounted on the support, a source of light, a lens system adapted to convey to the said plate rays coming from the source of light, the plate and the source of light, a thermoelement lying in the path of the rays which the plate allows to pass, a second thermoelement, a second lens system adapted to convey to the said second thermoelement rays coming from the source of light, for subduing the light means interposed in front of the said second thermoelement, an electric indicating instrument, electric lines connecting the said instrument with the said thermoelements, and a rest mounted on the said support, this rest being movable perpendicularly to the plate and bordering the plate at the spot to be examined.

9. In a device for ascertaining the opacity of blackened portions of photographic plates a support, a frame adapted for holding a photographic plate and being movably mounted on the support, a source of light, a lens system adapted to convey to the said plate rays coming from the source of light, the plate and the source of light, a thermoelement lying in the path of the rays which the plate allows to pass, a second thermoelement, a second lens system adapted to convey to the said second thermoelement rays coming from the source of light, a wedge-shaped smoked glass slidably supported and interposed in front of the said second thermoelement, an electric indicating instrument, electric lines connecting the said instrument with the said thermoelements, and on the said support a rest movable perpendicularly to the plate and bordering the plate at the spot to be examined.

ROBERT MECHAU.